United States Patent [19]
Capri et al.

[11] Patent Number: 5,418,897
[45] Date of Patent: May 23, 1995

[54] METHOD FOR ELIMINATION OF EXTRANEOUS LINES GENERATED BY RECTANGULAR POLYGON CLIPPING PROCESS

[75] Inventors: Sandra Capri, Eagle, Id.; Steven P. Ritacco, San Mateo, Calif.

[73] Assignee: Hewlett-Packard Company, Palo Alto, Calif.

[21] Appl. No.: 129,817

[22] Filed: Sep. 30, 1993

[51] Int. Cl.$^6$ .............................................. G06T 15/30
[52] U.S. Cl. ..................... 395/134; 395/133; 395/143
[58] Field of Search ............... 395/133-135, 395/143, 155, 157, 158, 161

[56] References Cited
U.S. PATENT DOCUMENTS

| | | | |
|---|---|---|---|
| 4,972,330 | 11/1990 | Matsushiro et al. | 395/134 |
| 5,040,130 | 8/1991 | Chang et al. | 395/134 |
| 5,231,695 | 7/1993 | Harrington | 395/134 |

Primary Examiner—Almis R. Jankus
Attorney, Agent, or Firm—Anthony J. Baca

[57] ABSTRACT

The present invention receives the output of a polygon clipper process and determines which lines are extraneous. This determination is accomplished by keeping a list of all potential extraneous lines. When a new line is generated, it is compared to all lines in the list. If the new line overlaps any of the lines in the list, both lines are shortened to remove the overlap. After the new line has been checked and any necessary modifications made, any lines remaining are placed into the list to be compared to future lines. After the polygon clipper and extraneous line eliminator have completed processing the polygon, the output of the clipper and the list are combined to complete the description of the clipped polygon.

10 Claims, 7 Drawing Sheets

METHOD FOR ELIMINATION OF EXTRANEOUS LINES GENERATED BY RECTANGULAR POLYGON CLIPPING PROCESS

FIELD OF THE INVENTION

The present invention relates to computer graphics systems, more specifically, to a method for removing extraneous lines as a result of polygon clipping. Polygon clipping is the process of removing those parts of a polygon that lies outside a region called the clip window.

BACKGROUND OF THE INVENTION

Computer graphic systems, including graphic printers, define pictures in a world coordinate system. This can be any Cartesian coordinates system that a user finds convenient. Pictures defined in world coordinates are then mapped by the graphic system into device coordinates, where the device may be for example, a computer screen or a printed page. Typically, a graphic system allows a user to specify which area of the picture definition is to be displayed and where it is to be placed on the display device. A single area can be chosen for display, or several areas can be selected. These areas can be placed in separate display locations, or one area can serve as a small insert into a larger area. This transformation process involves operations for transformation and scaling selected areas and for deleting picture parts outside the areas. These operations are referred to as windowing and clipping.

A rectangle area specified in world coordinates is called a window. The rectangular area on the display device to which a window is mapped is called a viewport. By changing the position of the viewport, objects can be displayed at different positions on an output device, Also, by varying the size of the viewport, the size and proportions of an object can be changed. When different sized windows are successively mapped onto a viewport, zooming effects can be achieved. As the windows are made smaller, a user can zoom in on some part of a scene to view details that are not shown with the larger windows. Similarly, more overview is obtained by zooming out from a section of a scene with successively larger windows. Panning effects are produced by moving a fixed-sized window across a larger picture.

Mapping a window onto a viewport results in the display of only the picture parts within the window. Everything outside the windowing is discarded. Procedures for eliminating all parts of a defined picture outside of specified boundaries are referred to as clipping.

Clipping procedures are generally classified as either a line clipper or a polygon clipper. A line clipper determines which lines are wholly within the window boundaries and which lines are to be totally or partially clipped. For lines that are to be partially clipped, the intersection points with the window boundaries must be calculated. Because a picture may contain thousands of line segments, the clipping process should be performed as efficiently as possible. One such line clipper was developed by Cohen and Sutherland. Another line clipper was developed by Liang and Barsky. Both these line clippers are known in the art of computer graphics.

Hollow polygons used in line drawing applications can be clipped by processing each component line through the line clipper. A polygon processed in this way is reduced to a series of clipped lines. When a polygon boundary defines a fill area, a modified version of the line clipping process is needed because the clipped polygon must remain a closed object. In this case, one or more areas must be produced to define the boundaries for area fill.

One technique for polygon clipping, developed by Sutherland and Hodgman, performs clipping by comparing a polygon to each window boundary in turn. The output of this process is a set of vertices defining the clipped area that is to be filled with a color or shading. See, I. E. Sutherland and G. W. Hodgman "Reentrant Polygon Clipping," Communication of the ACM, 17, 1, 32–42 (Jan. 1974).

Another technique for polygon clipping, developed by Liang and Barsky, performs clipping by expressing each edge as a parametric equation. Using this notation, the possible contributions that can be provided to the output polygon by a particular edge of the input polygon are enumerated. See, You-Dong Liang and Brian A. Barsky "An Analysis and Algorithm for Polygon Clipping," Communication of the ACM, 26, 11,868–877 (Nov. 1983) herein incorporated by reference. One advantage to the Liang and Barsky process is that arbitrarily shaped windows could be processed by using parametric line equations to describe both the window boundaries and the boundaries of the areas to be clipped. Another significant advantage to the Liang and Barsky process is its speed in rectangular clipping.

Both of the aforementioned polygon clipping processes produce a degenerate, or extraneous, edge when a concave polygon is clipped against a rectangular window. With a concave polygon, the output polygon may actually represent two or more distinct polygons. Because these polygon clipping processes produce only one list of vertices, these separate areas will be joined with connecting lines.

Weiler and Atherton have developed a process of polygon clipping that does not create extraneous lines. See, K. Weiler and P. Atherton, "Hidden Surface Removal Using polygon Area Sorting," SID-GRAPH '77 proceedings, Computer Graphics, 11, 2 214–222 (Summer 1977). However, the procedure is unnecessarily complex because of its ability to handle arbitrarily shaped windows. Many applications, particularly laser printing, must complete polygon clipping as quickly as possible. For these applications the Weiler process is not acceptable.

Therefore the primary purpose of the present invention is to provide a method to quickly remove any extraneous edges produced by a polygon clipping process.

SUMMARY OF THE INVENTION

In summary, the present invention receives the output of a polygon clipper process and determines which lines are extraneous. The method for eliminating these extraneous lines consists primarily of the following steps. First it must be determined if the clipper generated a new line. The clipper generates a new line if the polygon clipper created a line wherein neither end point of the line existed in the polygon and the line lies on the clip window.

Next, a previously extraneous line generated by the polygon clipping is extracted from a list of such previously extraneous lines. Because only those lines on the same side of the clip window are compared, a verification is made that both the previously extraneous line and the new line exist on the same side. A test is performed whether the new line overlaps the previously extraneous line. If so, an intermediate line is generated which represents those non-overlapping portions of either the new line or the previously extraneous line. The previously extraneous line is deleted from the list. Finally, the intermediate line is stored in the list.

DETAILED DESCRIPTION OF THE INVENTION

As stated above, the present invention receives the output of the clipping process and then determines if any lines generated are extraneous. One embodiment has the clipper pass each completely generated line to the line eliminator. The line eliminator then checks each line as it is generated. Another embodiment has the clipper, upon completion of the clipping process, pass all fully generated lines to the line eliminator the line eliminator then checks all the lines simultaneously. Which embodiment one chooses depends on the application. One skilled in the art of computer programming would be able to implement either embodiment without undue burden once one embodiment is described. For that reason, only the single process embodiment will be described in detail.

Figure 1:
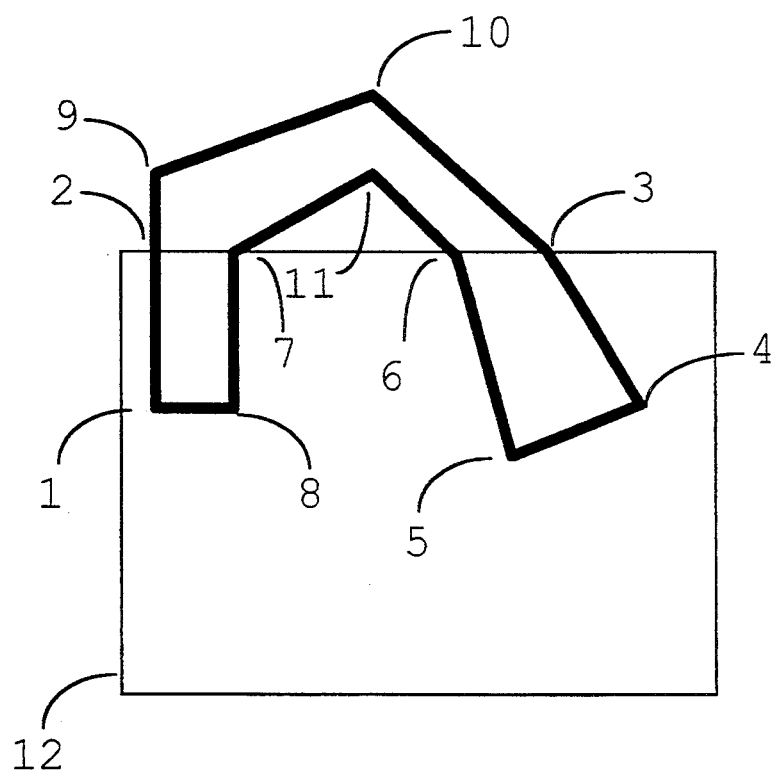
FIG. 1 is a pictorial representation of a polygon and a rectangular clip window.

Before a detailed description of the present invention can be given, the problem solved must be understood. Referring to FIG. 1, a polygon 1-2-9-10-3-4-5-6-1-1-7-8-1 is shown against a window 12. If the polygon and window are processed through a line clipper as described above, the result is six lines 2-1, 1-8, 7-8, 6-5, 5-4, and 4-3. Obviously, these lines no longer describe a polygon which, by definition, is a closed structure. Problems arise when the polygon is to be filled, where filling can be a color, texture or other entity. Because the once polygon is no longer a polygon, many of the fill processes such as flood fill, odd-even fill, and non-zero winding may not fill the "line art" properly.

Figure 2:
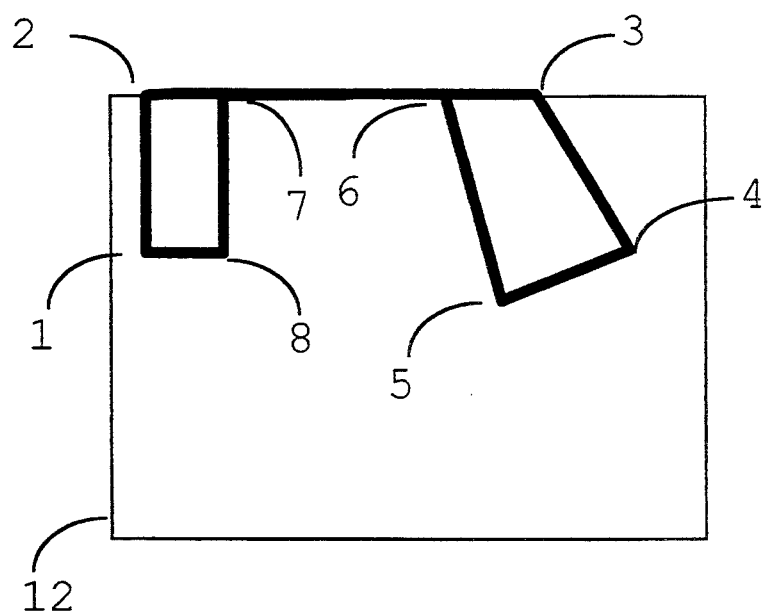
FIG. 2 shows the resultant extraneous lines and polygons generated by a polygon clip process.
Figure 3:
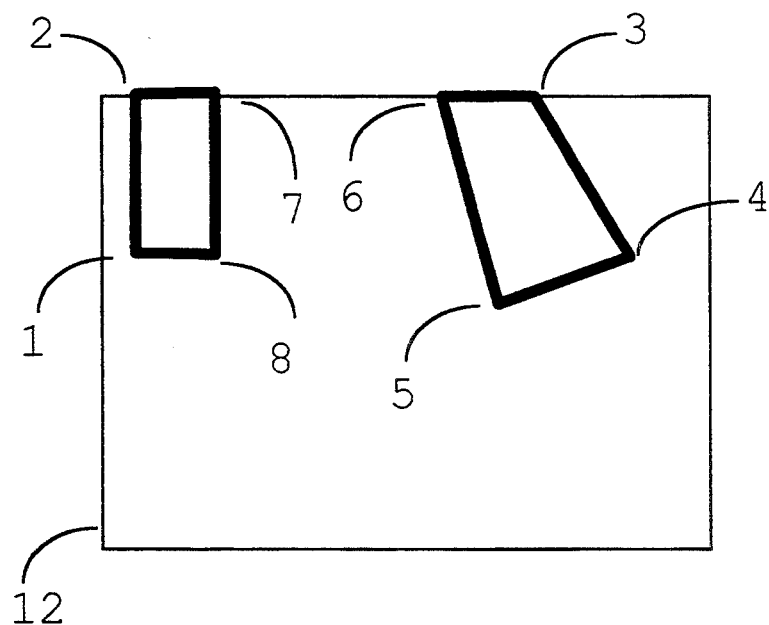
FIG. 3 shows the correct result after the clipped polygon has been processed through the present invention.

If the polygon of FIG. 1 is processed through either the Liang and Barsky or Sutherland and Hodgman polygon clipping processes, the result is shown in FIG. 2. It is readily apparent from FIG. 2 that, as Liang and Barsky stated, degenerate edges are generated, namely, 2-3 and 6-7. However, the process did properly generate two polygons as defined by 1-2-7-8-1 and 3-4-5-6-3. Once the degenerate edges, or extraneous lines, are removed, the correct result is shown in FIG. 3.

Figure 4:
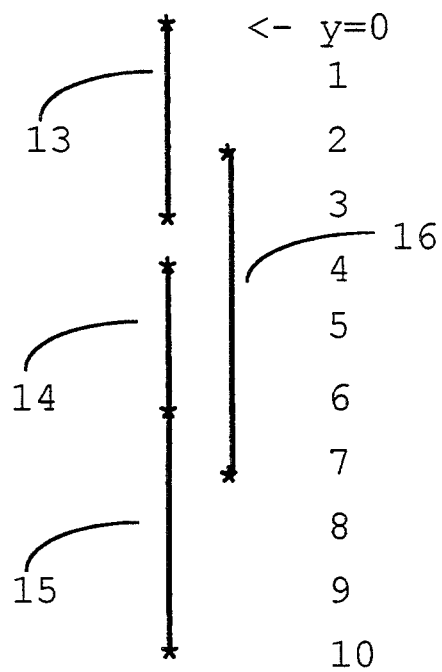
FIG. 4 is a line diagram used to help explain the present invention.
Figure 5:
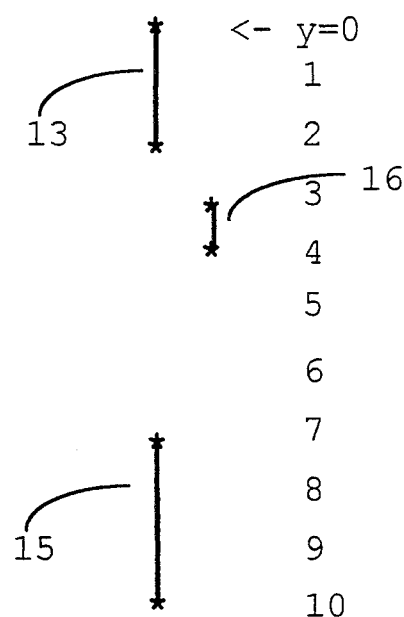
FIG. 5 is the correct result generated by the extraneous line eliminator from input of FIG. 4, in accordance with the present invention.

With that brief description of the problem, an example of the elimination process may help the reader better understand the basics of what the process must accomplish. Referring next to FIG. 4, the line eliminator must keep a list of all the possible extraneous lines that have already been processed. In the present embodiment the list has been given the name of POTENTIAL EDGE LIST. In FIG. 4 POTENTIAL EDGE LIST contains lines 13, 14 and 15. The polygon clipper has just generated a new line 16. A new line is a line that is on the clip window and neither end point existed in the input polygon. The line eliminator receives line 16 and starts comparing it to all lines in POTENTIAL EDGE LIST. First the process determines that line 16 overlaps with line 13. Therefore, both lines 13 and 16 must be shortened to remove the overlap. First line 13 is shorted to span from y=0 to y=2. Next, line 16 is shortened to start where line 13 ended, i.e., y=3. Line 16 is compared to line 14 where it is determined that line 16 completely overlaps line 14. Therefore line 14 is deleted from POTENTIAL EDGE LIST and line 16 must be changed to reflect the overlap. Line 16 will actually be broken into two pieces spanning from y=3 to y=4 and y=6 to y=7. Because the first section of line 16 (y=3-4) does not overlap any lines in POTENTIAL EDGE LIST, it is added to POTENTIAL EDGE LIST. However, the second section (y=6-7) is completely overlapped by line 15. Therefore, the second section of line 16 is deleted and line 15 is shortened to show the overlap. The end result, and thus the new content of POTENTIAL EDGE LIST, is shown in FIG. 5.

Figure 6:
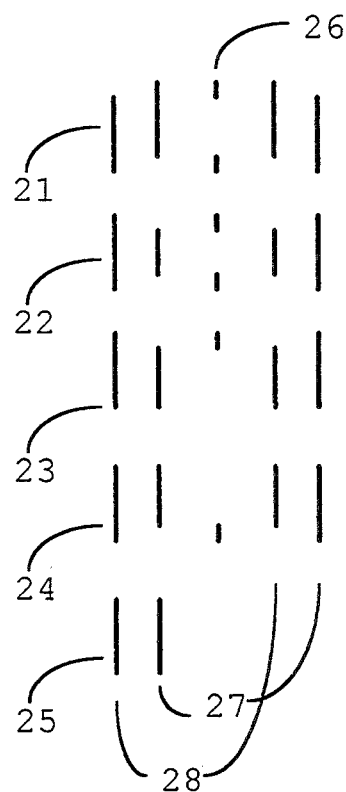
FIG. 6 shows the possible input to the present invention and the generated output.
Figure 7:
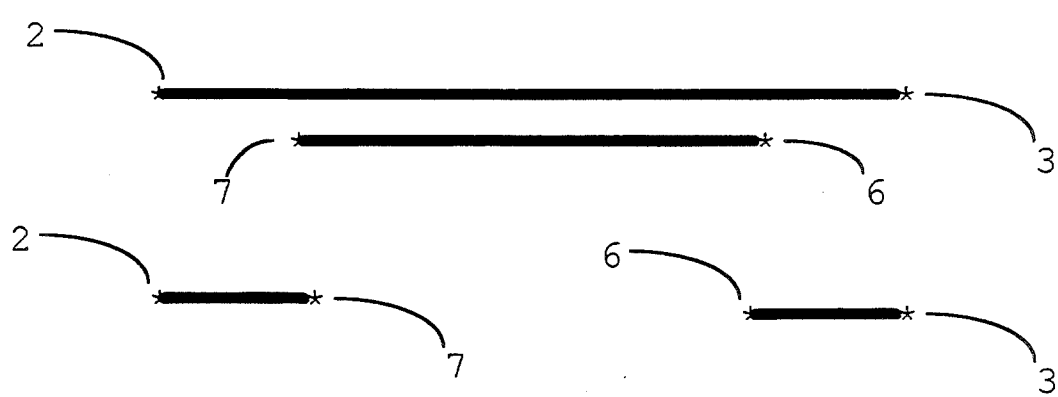
FIG. 7 shows the possible extraneous line generated as a result of clipping the polygon of FIG. 1 and the correct result after being processed by the present invention.

Looking at FIG. 6, the possible combinations of two lines are shown. In the figure, column 26 shows the output of the line eliminator while column 27 is the new line and 28 is the CURRENT line. The right side of FIG. 6 is simply a mirror image of the left side. For simplification, the below description only describes the left side. Right side manipulations would be in a similar manner. From top to bottom, the combinations are:

Case 1
  Lines offset. (21)
Case 2
  One line completely overlapped by other line. (22)
Case 3
  One line shorter with a first common end-point. (23)
Case 4
  One line shorter with a second common end-point. (24)
Case 5
  Both lines equal. (25)

In case #1, the lines are offset from each other. Here a first line is generated that runs from the top of the new line (27) to the top of the CURRENT line (28) and a second line is generated from the bottom of the two lines. To be consistent with the present discussion, the new line was shortened to become the top line and the CURRENT line was shortened to become the bottom line. In actual implementation, the CURRENT line and the new line are both deleted and the two new lines are generated and placed in POTENTIAL EDGE LIST. Case 2 is performed in a similar manner. Both lines are removed from POTENTIAL EDGE LIST. A first line extending from the top of one line to the top of another line is added to POTENTIAL EDGE LIST A second line from the bottom of one line to the bottom of the other is also added to POTENTIAL EDGE LIST. Cases 3 and 4 are also similar in that one line is completely overlapped by the other and the two lines share a common end-point. Here the result is a line that represents that portion of the longer line that did not overlap the shorter line. Finally, case 5 simply results in the cancellation of both lines.

Returning to the polygon of FIG. 1 and the extraneous lines generated by the polygon clipping process as shown in FIG. 2. If the polygon clipper starts at point 1, the first line checked is 1-9. Because the line is partially in the window 12 it is clipped at point 2. As stated above, the new line generated 1-2 does not meet the criteria of an entirely generated line. Next, line 9-10 is clipped against window 12. Because this line exists entirely outside the clip window, it is discarded. The clipper next clips line 10-3. Here the line is also outside the clip with the exception of endpoint 3. Under the Liang and Barsky process, a line from point 2 to point 3 is generated. One way to visualize this is that a line is drawn from the point of exiting the clip window to the point of entering the clip window. More detail about the clipping process can be obtained from the above cited references.

Because line 2-3 is an entirely new line, the line eliminator is called to check the line. Because, POTENTIAL EDGE LIST is empty, line 2-3 is simply added to POTENTIAL EDGE LIST and control is passed back to the clipper. Lines 3-4, 4-5 and 5-6 all are entirely within the clip window 12 and therefore are unchanged by the clipper. Line 6-11 is outside the clip window and therefore simply discarded. Line 11-7 is also discarded. However, because the clip window has been re-entered, a new line is generated from the point of exit 6 to the point of entry 7. Once again an entirely new line is generated and the line eliminator is called. This new line is compared to all the lines in POTENTIAL EDGE LIST and found to overlap line 2-3. Because line 6-7 is completely covered by line 2-3, line 6-7 is not added to POTENTIAL EDGE LIST. Line 2-3 is divided into two lines that represent those portions of line 2-3 that was not overlapping line 6-7. In short, line 2-3 becomes lines 2-7 and 3-6. Finally, lines 7-8 and 8-1 are completely within the clip window 12 and therefore are unchanged. Upon completion, POTENTIAL EDGE LIST contains two lines 2-7 and 3-6. These two lines together with the output of the polygon clipper completely describe the clipped polygon as shown in FIG. 3. It would be understood by one skilled in the art that the present invention is not limited to any particular clipping process.

Figure 8:
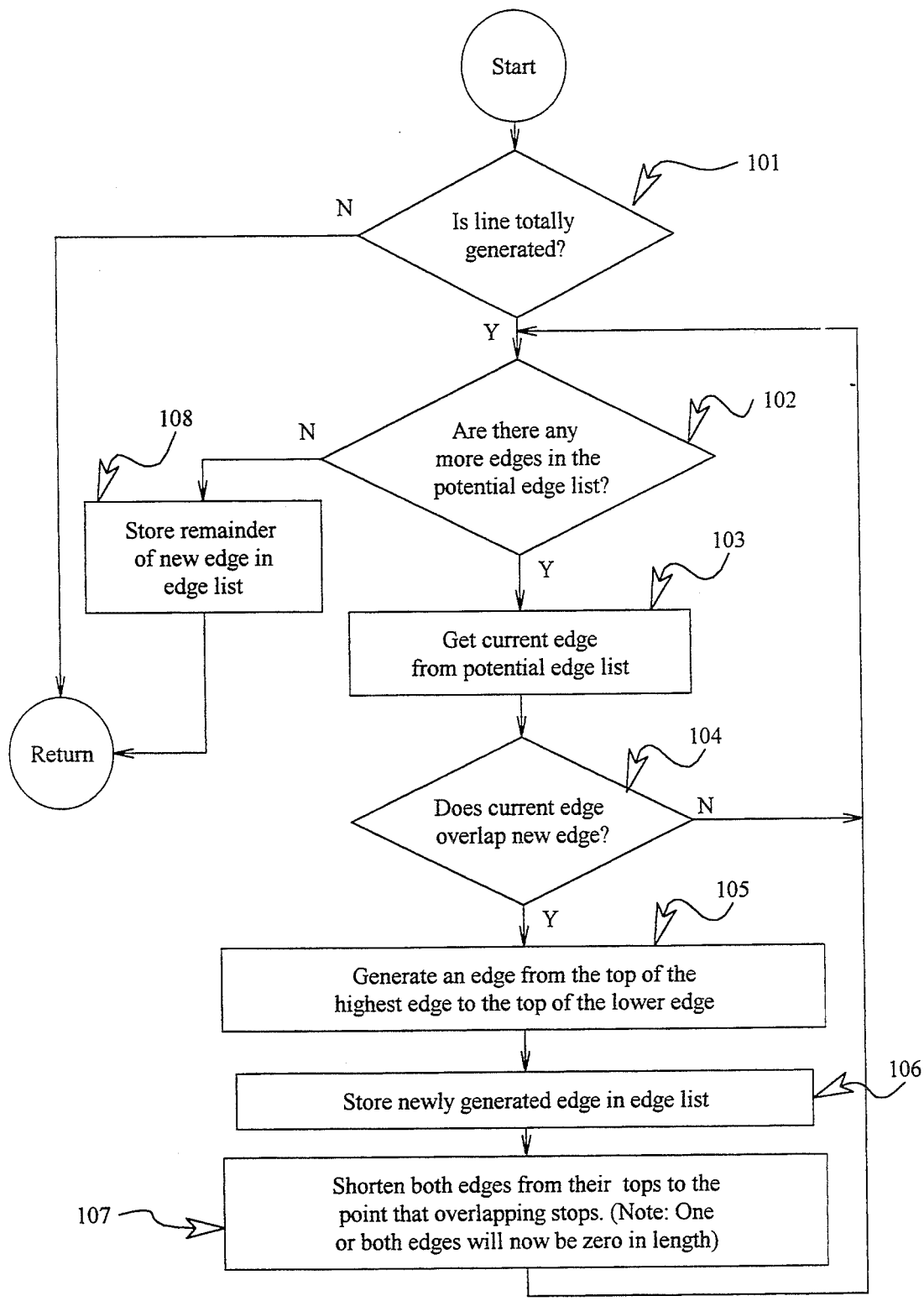
FIG. 8 is a high level logic flow diagram of the present invention.

FIG. 8 shows the high level logical flow of the present invention. In element 101, a check is made to determine if the NEW edge was totally generated. This test may be better placed within the clipper and used as a test on whether to call the line eliminator. If the edge was not totally generated, then the edge is not a possible extraneous line and the line eliminator is not called. Assuming the NEW edge was totally generated, then it must be compared to all the edges in the POTENTIAL EDGE LIST. First a check is made 102 to determine if their are any more potential edges in POTENTIAL EDGE LIST. This condition may be true for one of two reasons. First if the POTENTIAL EDGE LIST is empty, the there are no potential edges to compare and thus, the NEW edge is simply saved 108 in the POTENTIAL EDGE LIST with no change. The other possible condition occurs when all the potential edges have been compared to the NEW edge.

Assuming that there are edges in the POTENTIAL EDGE LIST, then the next edge is retrieved from the POTENTIAL EDGE LIST and placed in CURRENT 103. In box 104 the CURRENT and NEW edges are compared for any overlap. If the lines do not overlap, the process loops back around to box 102 to check and possible retrieve (103) the next potential edge. By reaching box 105, the two edges overlap in some form. An edge is generated from the top of the higher edge to the top of the lower edge. This newly generated edge is stored in POTENTIAL EDGE LIST 106. While not shown in FIG. 8 all edges stored in POTENTIAL EDGE LIST are stored in positional order. Finally, each edge is shortened such that they no longer overlap 107. After shortening at least one and possible both the lines will have a zero length.

The NEW edge is compared to each line in the POTENTIAL EDGE LIST. As an alternative, because all edges stored in POTENTIAL EDGE LIST are store in positional order, the loop can be terminated once the POTENTIAL EDGE LIST edges are out of range of the NEW edge. Upon completion of the loop, whatever remains of the NEW edge is stored in POTENTIAL EDGE LIST. Edges with zero length are not stored.

Figure 9:
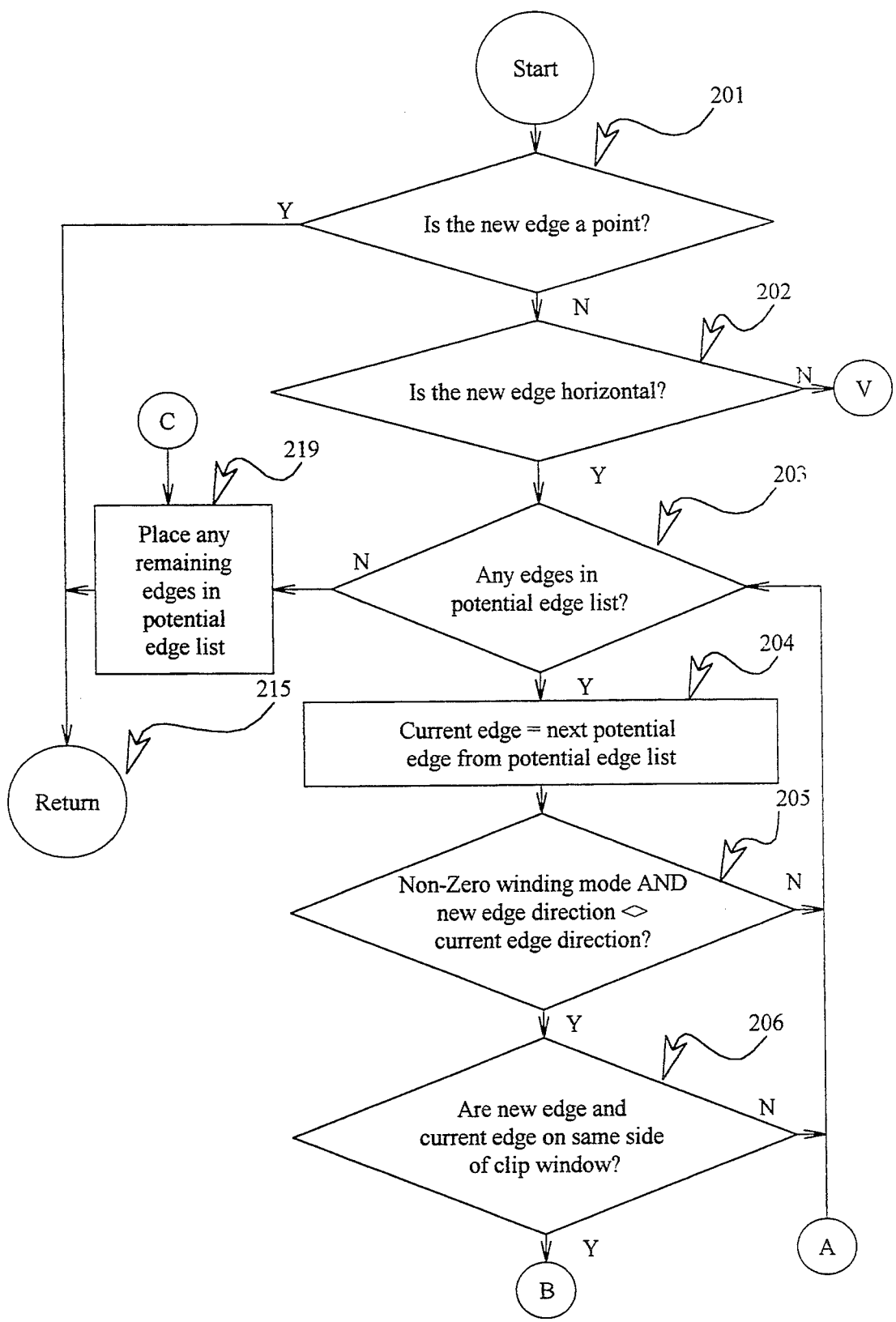
FIG. 9 is the first part of a detailed logic flow diagram of the present invention.
Figure 10:
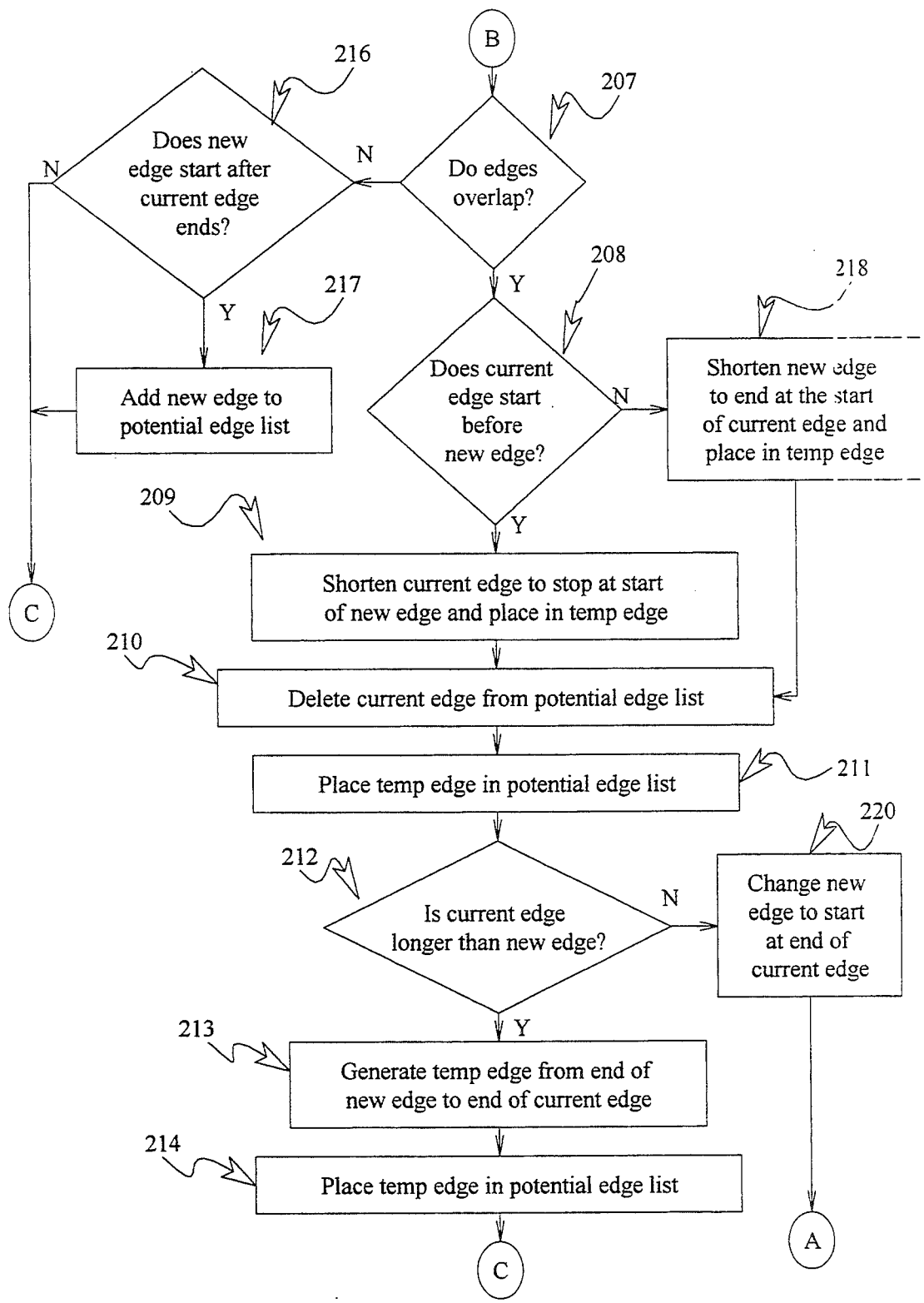
FIG. 10 is the second part of the detailed logic flow diagram of the present invention.

A detailed flow diagram for one possible implementation of the present invention is shown in FIGS. 9 and 10. As stated during the discussion of FIG. 8, the detection of whether the edge was totally generated is the testing criteria used to call the line eliminator. In box 201, a check is made on whether the NEW edge is simply a point and if so, it is not added to the POTENTIAL EDGE LIST and control is returned 215 to the clipper. Next, because the code is different for horizontal and vertical lines, box 202 branches to the proper section. Note, while the code is different, the logical flow is identical therefore, only the horizontal branch is shown. The first time through the line eliminator there are no potential edges. Thus, the NEW edge will be placed in the POTENTIAL EDGE LIST at box 219. On all subsequent passes through the process, box 204 will retrieve the next potential edge from the POTENTIAL EDGE LIST. Because the fill mode, in particular a non-zero winding (NZW) fill mode, can affect the elimination of a line, a check is made in box 205. If the fill mode is NZW and the lines have the same direction then the two lines do not overlap and no further check is necessary with this present line. Box 206 insures that only those lines on the same side of the clip window are compared for possible extraneous lines. Now referring to FIG. 10, if (207) the NEW edge and the CURRENT edge do not overlap, then a check is made 216 whether the NEW edge should be added to the POTENTIAL EDGE LIST 217. Because the POTENTIAL EDGE LIST is in positional order, if the NEW edge starts after the CURRENT EDGE and the two do not overlap, then the NEW edge should be placed in the POTENTIAL EDGE LIST just after the CURRENT edge and no further checks need to be performed 217. Assuming that the two edges do overlap, then box 208 determines which edge starts first. The edge that starts first is shortened to end at the start of the other edge in boxes 218 or 209. The CURRENT EDGE is deleted 210 from the POTENTIAL EDGE LIST and the TEMP edge is stored in its place 211. If the CURRENT EDGE is shorter, then the NEW edge is changed to start at the end of the CURRENT EDGE 220. In the alternative, a TEMP edge is generated extending from the end of the NEW edge to the end of the CURRENT EDGE 213. The newly generated edge is then added to the POTENTIAL EDGE LIST 214.

In summary, the present invention receives the output of a polygon clipper process and determines which lines are extraneous. This determination is accomplished by keeping a list of all potential extraneous lines. When a new line is generated, it is compared to all lines in the list. If the new line overlaps any of the lines in the list the lines are shortened to remove the overlap. After the new line has been checked and any necessary modifications made, any lines remaining are placed into the list to be compared to future lines.

Although the preferred embodiment of the invention has been illustrated, and that form described, it is readily apparent to those skilled in the art that various modifications may be made therein without departing from the spirit of the invention or from the scope of the appended claims.

What is claimed is:

1. A method for eliminating extraneous lines generated by a polygon clipping means where said polygon clipping means clips a polygon against a clip window, said method performed by a computer means, said computer means maintaining a list, where said list contains potential edges of said polygon, said method comprising the steps of:
   determining if said polygon clipping means generated a new line;
   if said step of determining determines that said polygon clipping means did generate said new line then extracting a potential edge from said list;
   first comparing said new line with said potential edge, if said step of first comparing determines said new line spatially starts before said previous edge then generating a first intermediate line which starts where said new line starts and ends where said previous edge starts, where said step of first comparing determines said new line starts after said previous edge, said step of generating generates said first intermediate line which starts where said previous edge starts and ends where said new line starts;
   second comparing said new line with said potential edge, if said step of second comparing determines said new line spatially ends after said previous edge then said step of generating generates a second intermediate line which starts where said previous edge ends and ends where said new line ends, where said step of second comparing determines said new line ends before said previous edge, said step of generating generates said second intermediate line which starts where said new line ends and ends where said previous edge ends; and
   storing said first intermediate line if so generated and said second intermediate line if so generated in said list and deleting said previous edge from said list, if neither said first intermediate line or said second intermediate line are generated then said step of storing stores said new line in said list.

2. A method as claimed in claim 1 wherein said step of determining determines that said clipping means did generate a new line if after clipping by said polygon clipping means a line is created wherein neither end point of said line existed in said polygon.

3. A method as claimed in claim 1 wherein said step of extracting bypasses said steps of first comparing and said second comparing if said list is empty.

4. A method as claimed in claim 1 wherein said step of determining further comprising the steps of:
   verifying that said new line and said previous edge exist on a same side of said clip window; and
   only executing said steps of first comparing and said second comparing if said step of verifying verifies that said new line and said previous edge are on the same side of said clip window.

5. A method as claimed in claim 4 wherein said steps of extracting, first comparing, second comparing, generating and storing are all repeated until all said potential edges in said list have been extracted.

6. A method for eliminating extraneous lines generated by a polygon clipping means where said polygon clipping means clips a polygon against a clip window, said polygon clipping means creating a new line, said method performed by a computer means, said computer means maintaining a list, where said list contains potential edges of said polygon, said method comprising the steps of:
   extracting a previous edge from said list;
   checking if said new line overlaps said previous edge;
   generating an intermediate line which represents those non-overlapping portions of either said new line or said previous edge;
   deleting said previous edge from said list; and
   storing said intermediate line in said list.

7. A method as claimed in claim 6 wherein further comprising the steps of:
   determining if said clipping means generated a new line such that said steps of extracting, checking, generating, deleting and storing are only executed if said step of determining determines that said clipping means did generate a new line, said step of determining determines that said clipping means did generate a new line if after clipping by said polygon clipping means a line is created wherein neither end point of said line existed in said polygon.

8. A method as claimed in claim 7 wherein said steps of determining, extracting, checking, generating, deleting and storing are all repeated until all said previous edges in said list have been extracted.

9. A method as claimed in claim 6 wherein said step of extracting generates said previous edge with a length of zero if said list is empty.

10. A method for eliminating extraneous lines generated by a polygon clipping means where said polygon clipping means clips a polygon against a clip window, said polygon clipping means creating a new line, said new line having a higher end and a lower end, said higher end of said new line being higher than said lower end of said new line, said method performed by a computer means, said computer means maintaining a list where said list contains potential edges of said polygon, said method comprising the steps of:
   extracting a previous edge from said list, said previous edge having a higher end and a lower end, said higher end of said previous edge being higher than said lower end of said previous edge;
   checking if said new line overlaps said previous edge;
   if said higher end of said new line is higher then said higher end of said previous edge, then generating an intermediate line have a higher end equal to said higher end of said new line and a lower end equal to said higher end of said previous edge, if in the alternative, said higher end of said new line is lower then said higher end of said previous edge, then said step of generating generates said intermediate line with a higher end equal to said higher end of said previous edge and a lower end equal to said higher end of said new line;

shortening said higher end of said new line until said higher end of said new line equals said lower end of said new line or said higher end of said new line equals said lower end of said previous edge, said step of shortening further shortens said higher end of said previous edge until said higher end of said previous edge equals said lower end of said previous edge or said higher end of said previous edge equals said lower end of said new line; and storing said intermediate line if so generated in said list, said step of storing further stores said new line in said list if said higher end of said new line is higher than said lower end of said new line, said step of storing further stores said previous edge in said list if said higher end of said previous edge is higher than said lower end of said previous edge.

* * * * *